(12) United States Patent
Dow et al.

(10) Patent No.: US 6,832,187 B1
(45) Date of Patent: Dec. 14, 2004

(54) METHODS OF PROVIDING PAGE PROTECTION IN A DIGITAL PRINTING SYSTEM HAVING MULTIPLE OUTPUT DEVICES

(75) Inventors: Richard M. Dow, Laramie, WY (US); Jeff H. Papke, Meridian, ID (US); Douglas J. Mellor, Meridian, ID (US); Richard Detweiler, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/310,074

(22) Filed: May 10, 1999

(51) Int. Cl.$^7$ ............................ G06F 9/00; G06K 15/00
(52) U.S. Cl. ........................ 703/27; 703/16; 358/1.11; 358/1.17
(58) Field of Search .................. 703/16, 17, 27, 703/15, 26; 358/1.11, 1.13, 1.17, 1.15, 1.16, 1.9

(56) References Cited

U.S. PATENT DOCUMENTS

| | | | |
|---|---|---|---|
| 5,129,049 A | | 7/1992 | Cuzzo et al. ............... 395/113 |
| 5,142,667 A | * | 8/1992 | Dimperio et al. ........... 395/115 |
| 5,444,827 A | | 8/1995 | Briggs et al. ............... 395/115 |
| 5,450,562 A | | 9/1995 | Rosenberg et al. .......... 395/446 |
| 5,459,818 A | | 10/1995 | Grant et al. ................. 395/114 |
| 5,463,776 A | | 10/1995 | Voigt et al. .................. 395/600 |
| 5,475,801 A | * | 12/1995 | Brindle et al. .............. 395/114 |
| 5,479,587 A | * | 12/1995 | Campbell et al. ........... 358/1.17 |
| 5,524,186 A | | 6/1996 | Campbell .................... 395/115 |
| 5,579,447 A | * | 11/1996 | Salgado ....................... 395/109 |
| 5,768,483 A | * | 6/1998 | Maniwa et al. ............. 395/114 |
| 5,768,516 A | * | 6/1998 | Sugishima ............. 395/200.47 |
| 5,781,707 A | | 7/1998 | Kunz et al. ................. 395/105 |
| 5,812,273 A | * | 9/1998 | Conley et al. .............. 358/296 |
| RE35,922 E | * | 10/1998 | Cuzzo et al. ................ 395/113 |
| 5,978,560 A | * | 11/1999 | Tan et al. .................... 395/114 |
| 6,052,200 A | * | 4/2000 | Mitani ........................ 358/1.16 |
| 6,092,171 A | * | 7/2000 | Relph ........................ 711/203 |
| 6,238,105 B1 | * | 5/2001 | Pardo .......................... 395/116 |
| 6,239,829 B1 | * | 5/2001 | Curry .......................... 347/251 |
| 6,373,585 B1 | * | 4/2002 | Mastie et al. ............... 358/1.15 |
| 6,433,884 B1 | * | 8/2002 | Kawakami ................. 358/1.15 |
| 6,559,958 B2 | * | 5/2003 | Motamed et al. .......... 358/1.13 |
| 6,606,165 B1 | * | 8/2003 | Barry et al. ................. 358/1.9 |

* cited by examiner

*Primary Examiner*—Thai Phan

(57) ABSTRACT

Methods of providing page protection in digital printing systems having multiple output devices are described. In one embodiment, first and second output devices are provided and have different time constraints for processing predetermined amounts of data which will ultimately be printed on a print medium. One of the time constraints is selected to provide a selected time constraint, and at least one predetermined amount of data is tested against the selected time constraint to determine whether the selected time constraint is satisfied. If the selected time constraint is not satisfied, the predetermined amount of data is transformed into a state which is more likely to satisfy the selected time constraint. In another embodiment, a first processing time constraint of a first output device is determined. The first processing time constraint impacts the manner in which a predetermined amount of data is processed into a printed image. A second processing time constraint of a second output device is determined. The second processing time constraint impacts the manner in which the predetermined amount of data is processed into a printed image. The first and second processing time constraints are compared and responsive to the comparison, the processing time constraint having a lesser magnitude is selected to provide a selected processing time constraint.

19 Claims, 4 Drawing Sheets

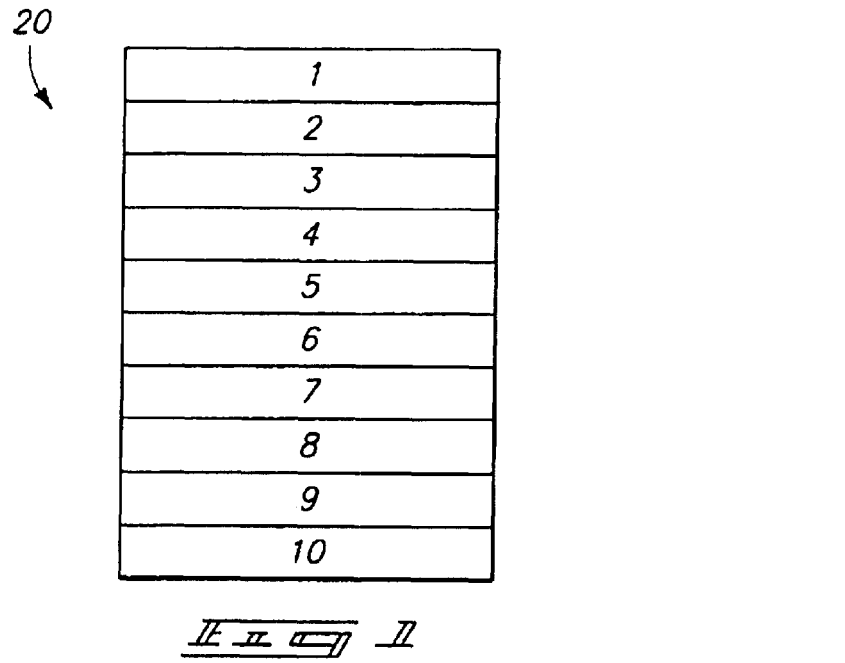
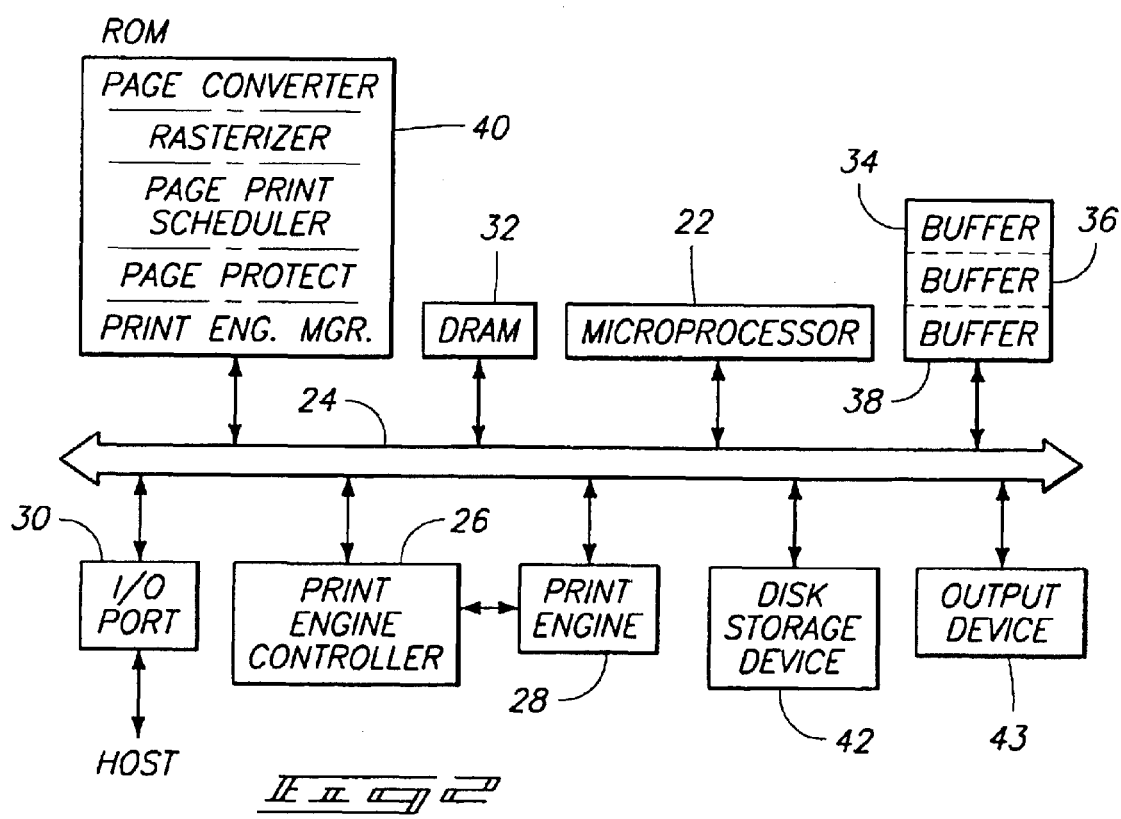

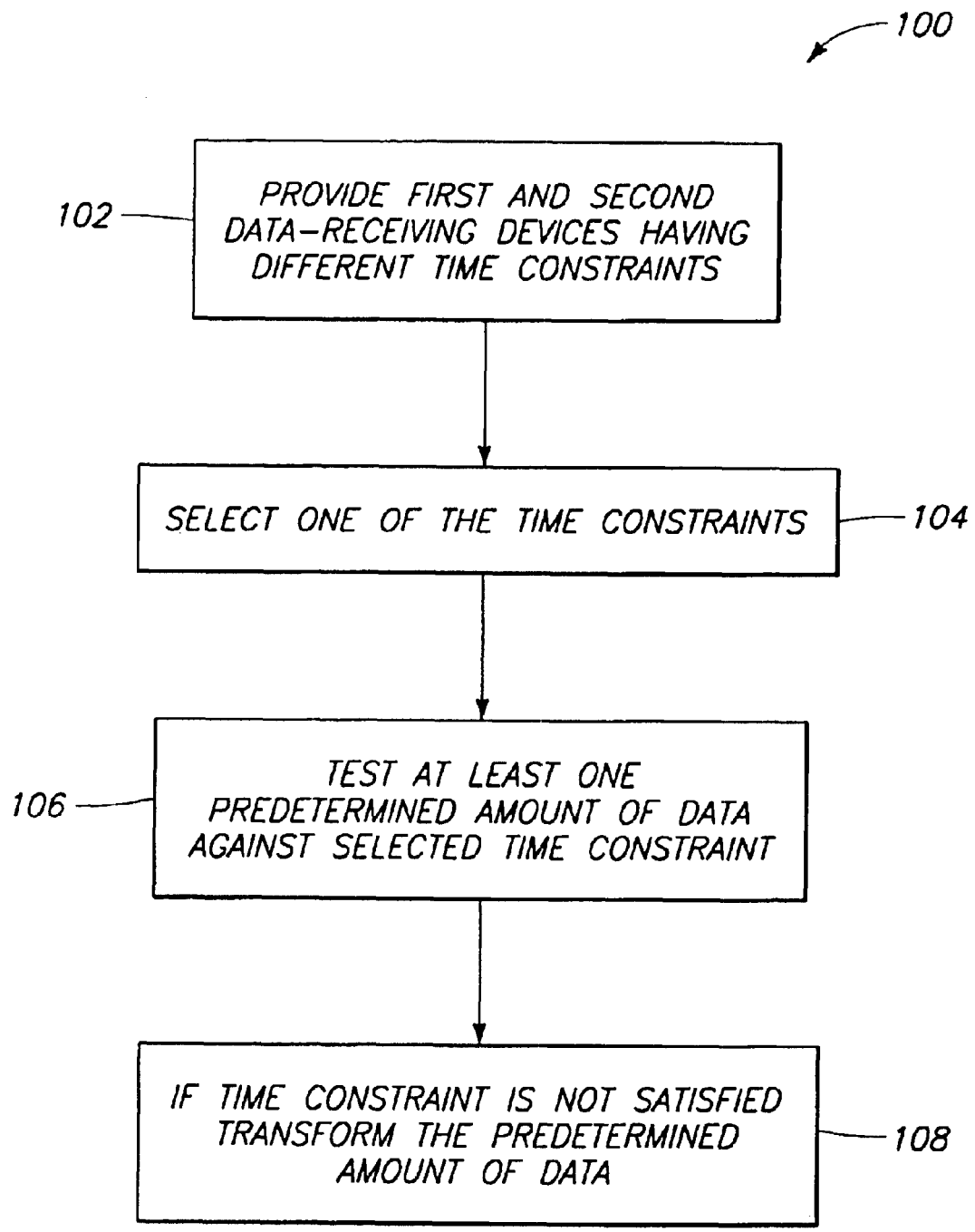

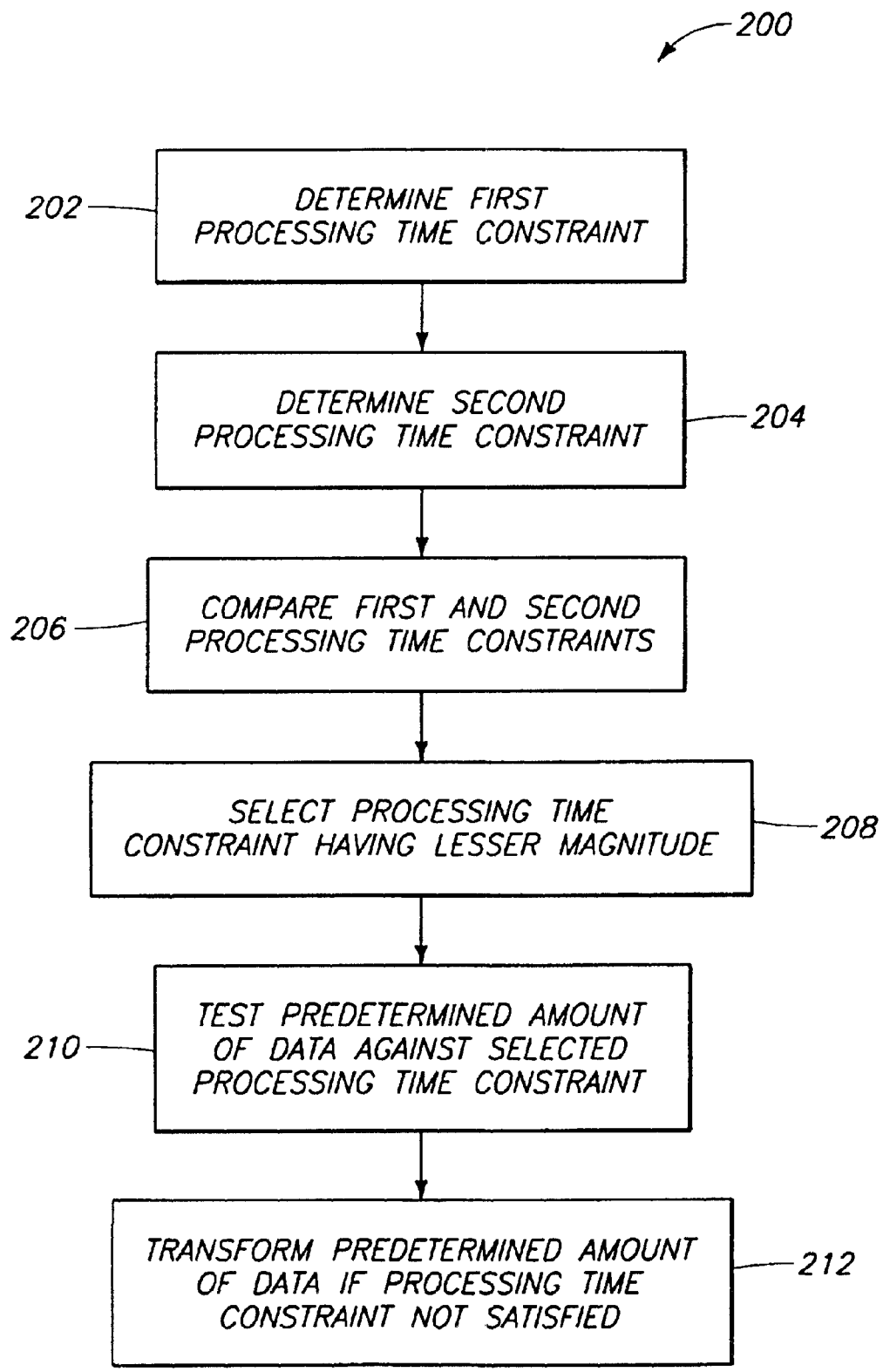

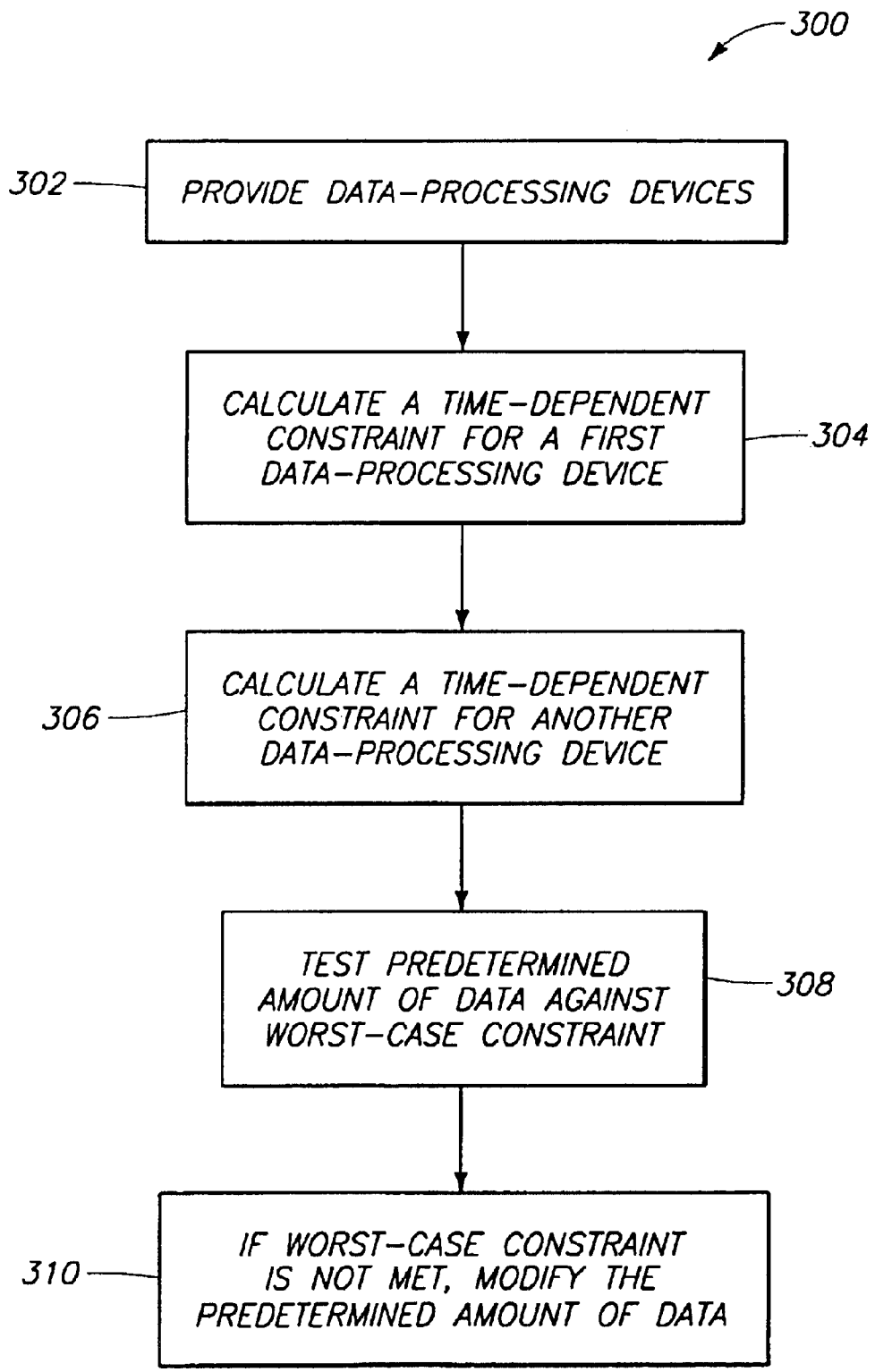

METHODS OF PROVIDING PAGE PROTECTION IN A DIGITAL PRINTING SYSTEM HAVING MULTIPLE OUTPUT DEVICES

FIELD OF THE INVENTION

This invention pertains generally to methods of providing page protection in a digital printing system having multiple output devices, and more particularly to laser printing systems having multiple output devices.

BACKGROUND OF THE INVENTION

In the past, peripheral units such as laser printers have typically captured an entire page before any image is placed on paper. The term "peripheral unit" as used in this document shall include, without limitation, any type of peripheral unit which produces a hard copy output or print media, e.g. laser printers (color or monochrome), copiers, facsimile devices, plotters, ink jet based devices, and the like. In peripheral units such as laser printers, formatting is either performed on the host computer (with large volumes of rasterized data being shipped to the printer), or on a formatter within the printer. Since a laser printer print engine operates at a constant speed, if new rasterized data is not available at a rate that keeps up with the engine's operation, a print "overrun" or so-called "punt" occurs and the page is not printable. Various methods for addressing print overrun situations are described in U.S. Pat. No. 5,479,587, the disclosure of which is incorporated by reference herein. Various other aspects of printers are described in the following U.S. patents, the disclosures of which are incorporated by reference: U.S. Pat. Nos. 5,450,562, and 5,459,818.

Modern printers often use firmware-driven, microprocessor-controlled formatters to control the operation of the printer. In systems where the data races the laser, so-called "punt protection" processes have been developed and employed on every page to ensure that the data keeps up with the engine speed. For example, after a page has been composed by a language-specific personality, but before it is released to the page-pipe-queue for printing by the engine, a punt protection process is employed. The punt protection process ensures that each page will race the laser in real-time, by assessing the complexity measure of each strip, and test-rasterizing the strip if necessary. If dictated by the complexity or the test-rasterization, the strip is transformed to a faster format in order to assure racing the laser, thus avoiding a punt in the real time printing of the page. Various aspects of overrun or punt protection are described in the following U.S. patents, the disclosures of which are incorporated by reference: U.S. Pat. Nos. 5,781,707, 5,129,049, 5,444,827, and 5,524,186.

An additional challenge to the various "punt protection" processes is the satisfaction of the requirements of multiple output devices within the same punt protection process. One specific example of two output devices is (1) a laser print engine and (2) a disk storage device that is used to store laser-ready jobs for later reprinting. As will be understood by those of skill in the art, the laser print engine typically demands its own punt protection requirements, while the disk storage device places a different set of requirements upon information being processed into a printed image. The requirements of the disk storage device can be driven by the speed of retrieval from the disk and transmission to the laser print engine, relative to the required delivery speed of the laser print engine and any accounting for available buffering in the disk-to-engine delivery path.

This invention arose out of concerns associated with improving page protection in the context of multiple output devices and the avoidance of duplicity or multiple sequential processing when a plurality of output devices are used.

SUMMARY OF THE INVENTION

Methods of providing page protection in digital printing systems having multiple output devices are described. In one embodiment, first and second output devices are provided and have different time constraints for processing predetermined amounts of data which will ultimately be printed on a print medium. One of the time constraints is selected to provide a selected time constraint, and at least one predetermined amount of data is tested against the selected time constraint to determine whether the selected time constraint is satisfied. If the selected time constraint is not satisfied, the predetermined amount of data is transformed into a state which is more likely to satisfy the selected time constraint.

In another embodiment, a first processing time constraint of a first output device is determined. The first processing time constraint impacts the manner in which a predetermined amount of data is processed into a printed image. A second processing time constraint of a second output device is determined. The second processing time constraint impacts the manner in which the predetermined amount of data is processed into a printed image. The first and second processing time constraints are compared and responsive to the comparison, the processing time constraint having a lesser magnitude is selected to provide a selected processing time constraint.

In yet another embodiment, a plurality of data-processing devices are provided having different time-dependent constraints for processing predetermined amounts of data which will ultimately be printed on a print medium. A time-dependent constraint for a first of the data-processing devices is calculated and is associated with a processing time of the first data-processing device relative to processing of the predetermined amounts of data. A time-dependent constraint for at least one other data-processing device is calculated. The time-dependent constraint for the other data-processing device is associated with a processing time of the other data-processing device relative to processing of the predetermined amounts of data. One of the calculated time-dependent constraints constitutes a worst-case constraint. At least one predetermined amount of data is tested against the worst-case constraint. If the worst-case constraint is not met, the predetermined amount of data is modified to satisfy the worst-case constraint. Other embodiments are described.

DESCRIPTION OF THE DRAWINGS

FIG. 1 shows an outline of a page and how it is broken into ten contiguous page strips.

FIG. 2 is a high-level block diagram of a printer which can embody various embodiments of the invention.

FIGS. 3–5 show various high-level flow diagrams describing various embodiments of the present invention.

DETAILED DESCRIPTION OF THE INVENTION

For purposes of understanding the various embodiments of the invention described just below, reference is made to FIGS. 1 and 2 which show aspects of an exemplary digital printing system in the form of a laser printer. Various aspects of exemplary digital printing systems are described in the patents incorporated by reference above. Hence, the discussion which appears just below is best understood in the context of the patents incorporated above.

FIG. 1 shows an exemplary page generally at 20. Page 20 is shown as a series of bands or strips which are numbered one through ten. Each band or strip covers a horizontal aspect of page 20. Text, graphics, etc. appearing in any one strip is treated separately during processing of a page. For purposes of this document, the term "predetermined amount of data" will be understood to include data which is contained within an individual strip or band. The various forms in which the "predetermined amount of data" can come include, without limitation, unrasterized data, partially-rasterized data, or fully rasterized data as will become apparent below.

FIG. 2 shows a high-level block diagram of a digital printing system in the form of a page printer which can incorporate one or more embodiments of the present invention. The digital printing system of FIG. 2 is shown for exemplary purposes only. Accordingly, other digital printing systems which are different from the one discussed just below could be used in connection with one or more embodiments of the invention. The digital printing system is controlled by a microprocessor 22 which communicates with other elements of the system via a bus 24. A print engine controller 26 and associated print engine 28 are connected to bus 24 and provide the print output capability for the page printer. For purposes of this document, print engine 28 is considered as an output device or a data-processing device. Print engine 28 is preferably a laser printer that employs an electrophotography drum imaging system, well known in the art.

An I/O port 30 is provided and provides communication between the page printer and a host computer and receives page descriptions from the host for processing within the page printer. A dynamic random access memory (DRAM) 32 provides random access memory for the page printer. A portion of DRAM 32 (shown separately) includes three, pre-allocated buffers 34, 36, and 38 which are employed during strip processing. It will be appreciated that DRAM 32 can include any number of pre-allocated buffers, e.g. two, four, and the like. A read only memory (ROM) 40 holds firmware which controls the operation of the page printer. A disk storage device 42 is provided and is used to store print-ready jobs for later reprinting. The disk storage device can be considered as another output device or a data-processing device. In addition, disk storage device 42 constitutes but one example of a computer-readable media which is configured to receive and hold rasterized data. Other computer-readable media can, of course, be utilized. Another output device 43 is provided and can be considered as another output device or a data-processing device.

Among the code stored in ROM 40 is the following: a page converter, rasterizer, page print scheduler (includes a page protect feature) and a print engine manager.

The page converter firmware converts a page description received from the host to a display command list. Each display command defines an object to be printed on the page. The rasterizer firmware converts each display command to an appropriate bit map which is passed to print engine 28 by print engine controller 26 and enables the generation of the text/graphics. The page print scheduler firmware controls the sequencing and transfer of page strip buffers to print engine controller 26. Within the page print scheduler is page protection firmware which assures that print overruns do not occur during the processing of a page. The print engine manager firmware controls the operation of print engine controller 26 and, in turn, print engine 28. The operation of the page printer shown in FIG. 2 commences when it receives a page description from a host computer via I/O port 30. The page description is placed in DRAM 32 and microprocessor 22 then accesses the description, line-by-line, and builds a display command list using the page converter firmware in ROM 40. The display command list is a set of commands that describe what must be printed and form an intermediate description of the page that will subsequently be converted to a rasterized bit map and utilized by print engine 28. As the display command list is being produced, the display commands are sorted by location on the page and allocated to the page strips.

As stated above, additional challenges are posed to the page protection firmware and algorithms when different devices having different requirements are incorporated into the digital printing system. For example, print engine 28 has one set of requirements relative to avoiding print overruns, and disk storage device 42 has another set of requirements for avoiding print overruns. Yet, if the page protection firmware does not take into account the different requirements imposed by print engine 28 and disk storage device 42, not only can the risk of an overrun be increased, but processing time can be increased by unnecessarily processing data which, otherwise, would not have to be processed. Such will become more apparent as the description below is considered.

FIG. 3 shows a flow diagram generally at 100 which describes one or more embodiments of the present invention. The method described by flow diagram 100 is preferably used in the context of digital printing systems having multiple output devices, such as those output devices described above. At 102, first and second output devices are provided having different time constraints for processing predetermined amounts of data which will ultimately be printed on a print medium. Exemplary "output devices" have been mentioned above with respect to print engine 28 and disk storage device 42 in FIG. 2. Other output devices can, however, be utilized in connection with the various embodiments of the invention. For example, exemplary output devices can include a computer network outside of the printer and on which predetermined amounts of data are stored, additional printers connected to a personal computer, and RAM disk structures to name just a few. At 104, one of the time constraints is selected to provide a selected time constraint. At 106, at least one predetermined amount of data is tested against the selected time constraint to determine whether the selected time constraint is satisfied. At 108, if the selected time constraint is not satisfied, the predetermined amount of data is transformed into a transformed predetermined amount of data which is more likely to satisfy the selected time constraint. Preferably, transformation of the predetermined amount of data results in a transformed predetermined amount of data which does satisfy the selected time constraint.

Transformation of the predetermined amount of data which can take place at 108 can comprise performing at least one of a pre-rasterization operation and a compression operation on the predetermined amount of data. Exemplary operations are described in one or more of the patents incorporated by reference above. Other forms of transformation can take place including partial pre-rasterization or conversion of data to a vector set instead of a bit map. An example of the former could include a situation where a display list contains both an image and a vector. Since the image is more complex to process, it can be pre-rasterized while the vector can be stored without pre-rasterization. An example of the latter could include a situation where character fonts are represented by a set of vectors, rather than a bit map.

In one embodiment, the first and second output devices which are provided at 102 have different time requirements affecting provision of rasterized data to one of the output devices. For example, and in the context of the system shown in FIG. 2, print engine 28 and disk storage device 42 have different time requirements which affect provision of rasterized data to print engine 28. Because it is possible to employ other output devices, it will be appreciated that the different time requirements can change as between differing devices.

In another embodiment, one of the output devices comprises a print engine which is configured to receive rasterized data and which has a first time requirement affecting provision of a rasterized input to the print engine. The second output device comprises a computer-readable media which is configured to receive and hold rasterized data. The computer-readable media has a second time requirement which affects provision of a rasterized input to the print engine. In one embodiment, the first and second time requirements are dependent upon a parameter which is associated with the speed of the print engine. In another embodiment, selection of the time constraint at 104 (FIG. 3) comprises comparing the first and second time requirements and selecting the time requirement which is lesser in magnitude.

As an illustrative example, consider the case where the first output device comprises a print engine, such as print engine 28 in FIG. 2, and the second output device comprises a disk storage device, such as disk storage device 42 in FIG. 2. The strips, bands, or predetermined amounts of data in the page are processed in sequence, pursuant to the typical algorithms which are normally used for overrun protection relative to the print engine. Exemplary algorithms are described in one or more of the patents incorporated by reference above. In but one example, for each strip, the available time for rendering of the strip is computed based upon the following parameters: (1) the speed of the print engine, (2) the available rendering-strip-buffers, and (3) the rendering time that has been consumed by previous strips on a page. These parameters set a rendering time requirement upon the strip in process. Additionally for each strip, the time requirements for the second output device are computed based upon the following parameters: (1) the speed of the print engine, (2) the available speed and buffering in the path of the second output device and the print engine, and (3) the rendering time that has been consumed by previous strips on the page. This available rendering time then sets an additional rendering time requirement upon the strip. The collective set of requirements or time constraints upon the strip is then examined, and the time requirement having the minimum rendering time is selected. If the strip fails to meet the minimum rendering time, then the strip is transformed into a faster strip format (e.g. prerendered and/or compressed) to meet the minimum rendering time requirement. The estimated rendering time of the current strip (in its final format) can then be recorded for use in the computation of available strip rendering times for subsequent strips, and for use in time budgeting for all output devices included in the printing system.

FIG. 4 shows a flow diagram generally at 200 in accordance with one or more embodiments of the present invention. At 202, a first processing time constraint of a first of the output devices is determined. The first processing time constraint impacts the manner in which a predetermined amount of data is processed into a printed image. At 204, a second processing time constraint of a second of the output devices is determined. The second processing time constraint impacts the manner in which the predetermined amount of data is processed into a printed image. At 206, the first and second processing time constraints are compared. Responsive to the comparison at 206, at 208 a processing time constraint is selected having a lesser magnitude to provide a selected processing time constraint.

In one embodiment, a predetermined amount of data is tested at 210 to determine whether the selected processing time constraint selected at 208 is satisfied. If the selected processing time constraint is not satisfied, then at 212, the predetermined amount of data is transformed into a format which satisfies the selected processing time constraint. In one embodiment, the first and second processing time constraints comprise rasterization times for providing the predetermined amount of data into a rasterized format. For purposes of this document, the term "rasterization time" is intended to include, without limitation, not only the time required to convert data (such as would be resident on a display list) to raster data, but also the time required to convert any compressed data to raster data. In the latter case, the rasterization time would include any required decompression time. In another embodiment, transformation of the predetermined amount of data at 212 takes place by performing at least one of a pre-rasterization operation and a compression operation on the predetermined amount of data. In yet another embodiment, the first output device comprises a print engine and the second output device comprises a computer readable media. An exemplary computer-readable media is shown in FIG. 2 at 42. Other computer-readable media can, of course, be used.

In yet another embodiment, a computer-readable medium is provided having computer-executable instructions resident thereon which, when executed by a computer, perform the method(s) set forth in one or more of the steps illustrated in flow chart 200. Exemplary computer-readable media include computer disks, CD ROMs, and various other computer-readable media which are capable of holding and/or storing computer-executable instructions as will be understood by those of skill in the art.

FIG. 5 shows a flow diagram generally at 300 which describes one or more embodiments of the present invention. At 302, a plurality of data-processing devices are provided having different time-dependent constraints for processing predetermined amounts of data which will ultimately be printed on a print medium. At 304, a time-dependent constraint is calculated for a first of the data-processing devices. The time-dependent constraint is associated with a processing time of the first data-processing device relative to processing of the predetermined amounts of data. At 306, a time-dependent constraint for at least one other data-processing device is calculated. The time-dependent constraint for the other data-processing device is associated with a processing time of the other device relative to processing of the predetermined amounts of data. One of the calculated time-dependent constraints which is calculated at steps 304 and 306 constitutes a worst-case constraint. At 308, at least one predetermined amount of data is tested against the worst-case constraint. At 310, if the worst-case constraint is not met, then the predetermined amount of data is modified to satisfy the worst-case constraint. In one embodiment, at least one of the data-processing devices comprises a print engine and at least another of the data-processing devices comprises a computer-readable media. In another embodiment, the time-dependent constraints comprise rasterization times for rasterizing the predetermined amounts of data. In another embodiment, at least one of the data-processing devices comprises a print engine, and the time-dependent constraints are functions of at least the print engine speed. In yet another embodiment, the predetermined amounts of data can be modified by performing at least one of a rasterization operation and a compression operation.

The various methods described by the flow diagrams of FIGS. 3–5, or at least portions thereof, can be implemented in any suitable hardware, software, or firmware. In one preferred embodiment, the methods or at least portions thereof are embodied in algorithms which are resident in a printer's firmware such as would be resident on ROM 40 in FIG. 2.

Various embodiments of the invention described just above can result in reductions in multiple sequential processing when multiple different output devices are used in connection with a digital printing system. Specifically, various embodiments of the invention can eliminate the redundant processing which results from having to conduct rasterization work twice, once in connection with one output device, and once in connection with a second output device. This, in turn, allows for treatment of high band width data which is going to be consumed by different output devices. Other advantages will be apparent to those of skill in the art.

What is claimed is:

1. A method comprising:
   providing at least first and second output devices having different time constraints for processing predetermined amounts of data which will ultimately be printed on a print medium;
   selecting one of the time constraints to provide a selected time constraint;
   testing at least one predetermined amount of data against the selected time constraint to determine whether the selected time constraint is satisfied;
   the selected time constraint is not satisfied, transforming the at least one predetermined amount of data into a transformed predetermined amount of data which is more likely to satisfy the selected time constraint; and
   said acts of providing, selecting, testing and transforming providing page protection in a digital printing system having multiple output devices.

2. The method of claim 1, wherein the providing of the at least first and second output devices having different time constraints comprises providing first and second output devices having different time requirements affecting provision of rasterized data to one of the output devices.

3. The method of claim 1, wherein the providing of the at least first and second output devices comprises providing a print engine configured to receive rasterized data, and providing a computer-readable media configured to receive and hold rasterized data.

4. The method of claim 1, wherein the providing of the at least first and second output devices having different time constraints comprises:
   providing a print engine configured to receive rasterized data, the print engine having a first time requirement affecting provision of a rasterized input to the print engine; and
   providing a computer-readable media configured to receive and hold rasterized data, the computer-readable media having a second time requirement affecting provision of a rasterized input to the print engine.

5. The method of claim 4, wherein the first and second time requirements are dependent upon a parameter associated with the speed of the print engine.

6. The method of claim 5, wherein the selecting of the time constraint comprises comparing the first and second time requirements and selecting the time requirement which is lesser in magnitude.

7. The method of claim 1, wherein the transforming of the at least one predetermined amount of data comprises performing at least one of a pre-rasterization operation and a compression operation on the predetermined amount of data.

8. A method comprising:
   determining a first processing time constraint of a first of the output devices, said first processing time constraint impacting the manner in which a predetermined amount of data is processed into a printed image;
   determining a second processing time constraint of a second of the output devices, said second processing time constraint impacting the manner in which the predetermined amount of data is processed into a printed image;
   comparing the first and second processing time constraints;
   responsive to said comparing, selecting the processing time constraint having a lesser magnitude to provide a selected processing time constraint;
   said acts of determining a first processing time constraint, determining a second processing time constraint, comparing and selecting providing page protection in a digital printing system having multiple output devices; and
   testing a predetermined amount of data to determine whether the selected processing time constraint is satisfied, and if said selected processing time constraint is not satisfied, transforming the predetermined amount of data into a format which satisfies the selected processing time constraint.

9. The method of claim 8, wherein the first and second processing time constraints comprise rasterization times for providing the predetermined amount of data into a rasterized format.

10. The method of claim 8, wherein the first and second processing time constraints comprise rasterization times for providing the predetermined amount of data into a rasterized format, and further comprising testing the predetermined amount of data to determine whether the selected processing time constraint is satisfied, and if said selected processing time constraint is not satisfied, transforming the predetermined amount of data into a format which satisfies the selected processing time constraint.

11. The method of claim 10, wherein said transforming comprises performing at least one of a pre-rasterization operation and a compression operation on the predetermined amount of data.

12. The method of claim 11, wherein the first output device comprises a print engine, and the second output device comprises a computer-readable media.

13. A computer-readable medium having computer-executable instructions resident thereon which, when executed by a computer perform the method of claim 8.

14. A method comprising:
   providing a plurality of data-processing devices having different time-dependent constraints for processing predetermined amounts of data which will ultimately be printed on a print medium;
   calculating a time-dependent constraint for a first of the data-processing devices, the time-dependent constraint being associated with a processing time of the first data-processing device relative to processing of the predetermined amounts of data;

calculating a time-dependent constraint for at least one other data-processing device, the time-dependent constraint for the other data-processing device being associated with a processing time of the other data-processing device relative to processing of the predetermined amounts of data, one of the calculated time-dependent constraints constituting a worst-case constraint;

testing at least one predetermined amount of data against the worst-case constraint;

if the worst-case constraint is not met, modifying the at least one predetermined amount of data to satisfy the worst-case constraint; and said acts of providing, calculating a time-dependent constraint for a first of the data-processing devices, calculating a time-dependent constraint for at least one other data-processing device, testing, and modifying providing page protection for multiple data-processing devices in a digital printer system.

15. The method of claim 14, wherein at least one of the data-processing devices comprises a print engine, and at least another of the data-processing devices comprises a computer-readable media.

16. The method of claim 14, wherein the time-dependent constraints comprise rasterization times for rasterizing the predetermined amounts of data.

17. The method of claim 14, wherein at least one of the data-processing devices comprises a print engine, and at least another of the data-processing devices comprises a computer-readable media, and further wherein the time-dependent constraints comprise rasterization times for rasterizing the predetermined amounts of data.

18. The method of claim 14, wherein at least one of the data-processing devices comprises a print engine and the time-dependent constraints are functions of at least the print engine speed.

19. The method of claim 14, wherein the modifying of the at least one predetermined amount of data comprises performing at least one of a rasterization operation and a compression operation on the at least one predetermined amount of data.

* * * * *

UNITED STATES PATENT AND TRADEMARK OFFICE
CERTIFICATE OF CORRECTION

PATENT NO.    : 6,832,187 B1
DATED         : December 14, 2004
INVENTOR(S)   : Richard M. Dow et al.

It is certified that error appears in the above-identified patent and that said Letters Patent is hereby corrected as shown below:

Column 7,
Line 39, before "the selected time" insert -- if --.

Signed and Sealed this

First Day of November, 2005

JON W. DUDAS
*Director of the United States Patent and Trademark Office*